US007689492B2

(12) United States Patent
Coates

(10) Patent No.: US 7,689,492 B2
(45) Date of Patent: Mar. 30, 2010

(54) PRODUCTS, SYSTEMS AND METHODS FOR SCALE-IN PRINCIPAL PROTECTION

(75) Inventor: John S. Coates, Villanova, PA (US)

(73) Assignee: Morgan Stanley, New York, NY (US)

( * ) Notice: Subject to any disclaimer, the term of this patent is extended or adjusted under 35 U.S.C. 154(b) by 509 days.

(21) Appl. No.: 11/196,358

(22) Filed: Aug. 3, 2005

(65) Prior Publication Data

US 2007/0033121 A1    Feb. 8, 2007

(51) Int. Cl.
*G06Q 40/00*    (2006.01)
(52) U.S. Cl. ..................................... 705/36 R
(58) Field of Classification Search .................. 705/35, 705/36
See application file for complete search history.

(56) References Cited

U.S. PATENT DOCUMENTS

| | | | | |
|---|---|---|---|---|
| 5,812,987 | A * | 9/1998 | Luskin et al. ............. | 705/36 R |
| 6,275,814 | B1 * | 8/2001 | Giansante et al. ......... | 705/36 R |
| 6,799,167 | B1 * | 9/2004 | Gullen et al. ............. | 705/36 R |
| 7,016,870 | B1 * | 3/2006 | Jones et al. .................... | 705/35 |
| 7,016,873 | B1 * | 3/2006 | Peterson et al. ........... | 705/36 R |
| 7,174,313 | B1 * | 2/2007 | Martinez .................. | 705/36 R |
| 7,243,081 | B2 * | 7/2007 | Friend et al. .............. | 705/36 R |
| 2002/0123953 | A1 * | 9/2002 | Goldfarb et al. ............. | 705/36 |
| 2002/0174045 | A1 * | 11/2002 | Arena et al. ................... | 705/36 |
| 2003/0055765 | A1 * | 3/2003 | Bernhardt .................... | 705/36 |
| 2003/0120575 | A1 * | 6/2003 | Wallman ..................... | 705/36 |
| 2003/0126054 | A1 * | 7/2003 | Purcell, Jr. .................. | 705/36 |
| 2003/0172018 | A1 * | 9/2003 | Chen et al. .................... | 705/36 |
| 2004/0054612 | A1 * | 3/2004 | Ocampo ..................... | 705/36 |
| 2005/0010516 | A1 * | 1/2005 | Ivanov et al. ................. | 705/36 |
| 2006/0010053 | A1 * | 1/2006 | Farrow ........................ | 705/35 |
| 2006/0015429 | A1 * | 1/2006 | Sullivan et al. ............... | 705/35 |
| 2007/0124227 | A1 * | 5/2007 | Dembo et al. ............ | 705/36 R |
| 2007/0208643 | A1 * | 9/2007 | Gauthereon et al. ....... | 705/36 R |

OTHER PUBLICATIONS

Kung et al. Portable Alpha—Philosophy, Process & Performance, Spring 2004, Journal of Portfolio Management , pp. 1-14.*
Chernoff, J. Bernstein amends policy portfolio mantra, Sep. 1, 2003, Pensions & Investments, vol. 31, Issue 18, p. 3.*
Petzel, Togo E. Portable alpha travels new roads, Apr. 17, 2000, Pension & Investments, vol. 28, Issue 8, p. 40.*

(Continued)

*Primary Examiner*—Hani Kazimi
*Assistant Examiner*—Bijendra K Shrestha
(74) *Attorney, Agent, or Firm*—K & L Gates LLP

(57) ABSTRACT

A financial product. The financial product includes an underlying portfolio component, a fixed income component, and a scale-in component. The underlying portfolio component includes an initial investment allocation into an alpha-generating portfolio. The fixed income component is structured and arranged to generate a predictable rate of return and includes an initial investment allocation into a fixed income portfolio. The scale-in component is structured and arranged to increase the investment allocation into the underlying portfolio component when a cumulative return of the alpha-generating portfolio exceeds a threshold amount.

17 Claims, 4 Drawing Sheets

OTHER PUBLICATIONS

Robert, Arnott D. Risk budgeting and portable alpha, Journal of Investing, Summer 2002, vol. 11, Issue 2, p. 15.*

Stapleton, J. Perplexed by portable alpha. Golbal Investor. London, Mar. 2004, p. 1.*

Kung et al.: Portable Alpha—Philisophy, Process & Performance, Spring 2004, Journal of Portfolio Management, pp. 78-87.*

Stein et al.: Overlay portfolio management in a multi-manager account, Spring 2003, Journal of Wealth Management, pp. 1-17.*

* cited by examiner

PRODUCTS, SYSTEMS AND METHODS FOR SCALE-IN PRINCIPAL PROTECTION

BACKGROUND

This application discloses an invention that is related, generally and in various embodiments, to enhanced financial products, systems, and methods for providing a certain level of principal protection in order to truncate the downside risk of an investment in a portfolio.

Many investors are interested in principal protection for truncating downside risk from an investment program. Classical principal protection is well established, with many insurers and investment managers globally actively marketing the product. One technique for providing principal protection involves purchasing one or more securities together with put options or stop loss orders on such securities. Another technique is to purchase a portfolio and enter into a portfolio insurance strategy under which an investment manager uses an algorithm that attempts to dynamically replicate a put on part or all of the portfolio if the value of the portfolio declines.

Some techniques can be implemented when there is an options market for the securities or when futures can be used to dynamically hedge an asset class, such as principal protection on an investment in the S&P 500.

A common method to provide principal protection is "constant proportion portfolio insurance (CPPI)". This method of principal protection is to enter into a principal protected note or other arrangement with an insurer or other provider. The provider in turn uses a portion of the initial principal to purchase a zero-coupon bond or other low risk investment for the term of protection and invests the remainder directly or indirectly in the portfolio to be protected. The income from the zero-coupon bond or other investment is designed to offset most potential losses in the portfolio over the term of protection. If the portfolio begins to lose more than expected, the insurer or other provider begins selling some of the portfolio to limit the magnitude of additional downside risk.

CPPI depends upon the ease of de-levering, which in turn depends upon an adequately liquid underlying portfolio and an adequately long term (e.g., 5-10 years) for the zero-coupon bond or other low risk investment to generate offsetting income. Insurers typically want a meaningful part of the underlying portfolio to have very short-term liquidity and low volatility, together with a sufficiently long term of protection.

The traditional techniques for providing principal protection are not able to provide principal protection over short periods of time (e.g., less than three years) for an underlying portfolio that does not have significant monthly liquidity (e.g., certain types of fund of hedge funds). Accordingly, there exists a need for enhanced financial methods, products, and systems for providing some level of principal protection for such situations.

SUMMARY

In one general respect, this application discloses a financial product. According to various embodiments, the financial product comprises an underlying portfolio component, a fixed income component, and a scale-in component. The underlying portfolio component comprises an initial investment allocation into an alpha-generating portfolio. The fixed income component is structured and arranged to generate a predictable rate of return and comprises an initial investment allocation into a fixed income portfolio. The scale-in component is structured and arranged to increase the investment allocation into the underlying portfolio component when a cumulative return of the alpha-generating portfolio exceeds a threshold amount.

In another general respect, this application discloses a method. According to various embodiments, the method comprises designing a financial product for a client. The financial product comprises an underlying portfolio component, a fixed income component, and a scale-in component. The underlying portfolio component comprises an initial investment allocation into an alpha-generating portfolio. The fixed income component is structured and arranged to generate a predictable rate of return and comprises an initial investment allocation into a fixed income portfolio. The scale-in component is structured and arranged to increase the investment allocation into the underlying portfolio component when a cumulative return of the alpha-generating portfolio exceeds a threshold amount.

In another general respect, this application discloses a financial system. According to various embodiments, the financial system comprises a provider system configured to provide a financial product. The financial product comprises an underlying portfolio component, a fixed income component, and a scale-in component. The underlying portfolio component comprises an initial investment allocation into an alpha-generating portfolio. The fixed income component is structured and arranged to generate a predictable rate of return and comprises an initial investment allocation into a fixed income portfolio. The scale-in component is structured and arranged to increase the investment allocation into the underlying portfolio component when a cumulative return of the alpha-generating portfolio exceeds a threshold amount.

Aspects of the disclosed invention may be implemented by a computer system and/or by a computer program stored on a computer readable medium. The computer readable medium may comprise a disk, a device, and/or a propagated signal.

Other features and advantages will be apparent from the following description, including the drawings, and from the claims

DETAILED DESCRIPTION

In various embodiments, the disclosed invention is directed to financial methods, products, and systems for providing a level of principal protection. It should be understood that the methods, products, and systems described below may include various other processes, components, and elements in actual implementation.

Figure 1:
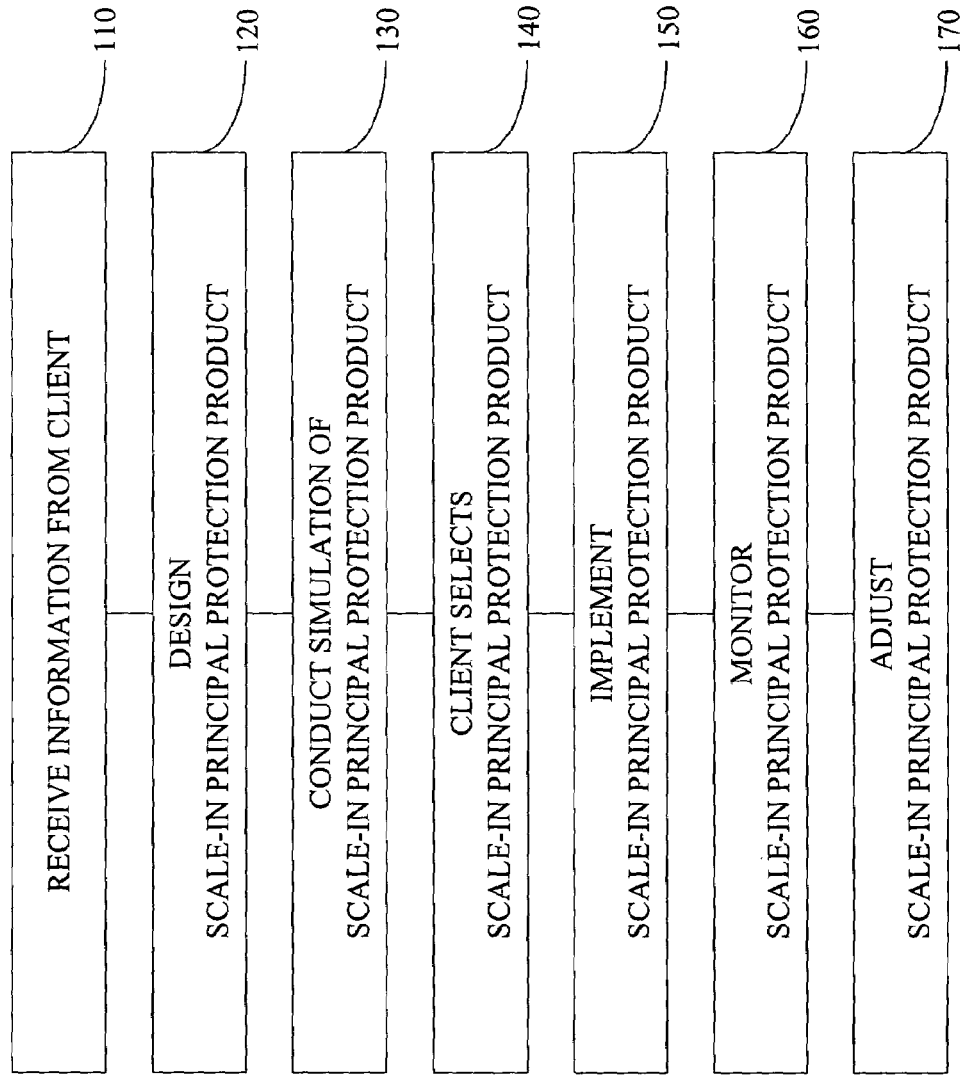
FIG. 1 illustrates various embodiments of a financial method.

FIG. 1 illustrates various embodiments of a financial method 10 for providing principal protection. In various implementations, each step of the financial method 10 may be implemented, at least in part, by hardware (e.g., device, computer, computer system, equipment, component); software (e.g., program, application, instruction set, code); storage medium (e.g., disk, device, propagated signal); or combination thereof. It should be noted, however, that the financial method 10 may be performed in any manner consistent with aspects of the disclosed invention.

At step 110, an entity receives information from a client. In various implementations, the entity may include, form part of, or be associated with a financial services entity structured and arranged to provide financial services such as, for example, securities services, investment management services, and credit services. The client may include, form part of, or be associated with an investor, an advisor to an investor, an investing entity, an insurer, etc. The entity and client may include or utilize various hardware, software, and/or storage mediums for providing and receiving financial services.

In general, the entity solicits and receives information from the client in order to gain an understanding of the client's investment objectives (e.g., assets, liabilities, investment resources, principal protection period, liquidity needs, return expectations, and risk tolerance). Examples of information that may be requested by and supplied to the entity include, but are not limited to: the characteristics of an underlying portfolio to be protected, the client's time horizon for protection, the floor loss tolerance that a client is willing to accept for the total product, denomination of assets and liabilities (in US dollars or other currency), duration and nature of liabilities, nature of the outflows (e.g., employee demographics and/or payout requirements), the expected effect of inflation on future liabilities and payouts, liquidity needed to satisfy annual payouts, tax considerations (e.g., tax situation, tax consequences, requirements to retain tax-exempt status), investment preferences about asset portfolio volatility (e.g., expectations and risk tolerance), and/or accounting nuances of assets and liabilities.

At step 120, the entity designs a scale-in principal protection product based upon the client information. The scale-in principal protection product may be tailored according to the needs of specific clients. For example, some clients might want a two-year horizon and be willing to accept a floor loss for the total product that is slightly negative.

In general, the scale-in principal protection product is structured and arranged to provide principal protection with less reliance on the returns from the return fixed income component and/or on the ability to delever than is the case for CPPI. The scale-in principal protection product does involve a small but non-zero probability that the fixed income component will not generate sufficient income to offset losses in the underlying portfolio over the full term of the protection. Also, in contrast to traditional principal protection, the scale-in principal protection product is effective for shorter time periods such as one, two or three-year horizons, as well as for longer periods of time.

In various embodiments, the scale-in principal protection product is structured and arranged to provide principal protection over a relatively short period of time (e.g., 3 years or less) for an underlying portfolio. The underlying portfolio may be expected to generate superior returns, i.e., returns above a relevant performance benchmark ("alpha" above a benchmark). The underlying portfolio may be an alpha-generating portfolio, and the alpha-generating portfolio may include a fund of hedge funds portfolio that includes a diversified mix (e.g., 30 or more) of underlying hedge funds allocated over various strategies. According to other embodiments, the scale-in principal protection product may be structured and arranged to provide principal protection over longer periods of time and the underlying portfolio may have more or less short-term liquidity.

Figure 2:
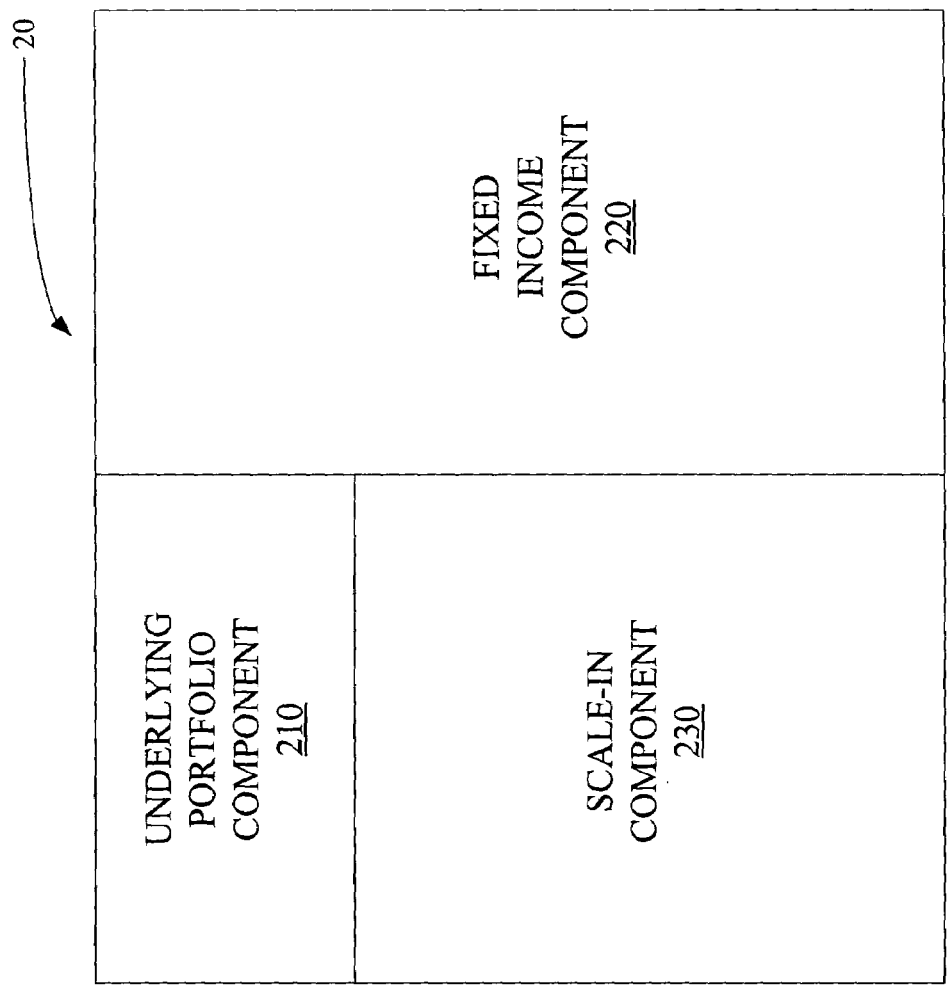
FIG. 2 illustrates various embodiments of a financial product.

FIG. 2 illustrates various embodiments of a scale-in principal protection product 20 according to aspects of the disclosed invention. The scale-in principal protection product 20 may be embodied as one or more paper and/or electronic documents and generally may contain one or more rights and obligations in the context of a financial transaction. As shown, the scale-in principal protection product 20 includes an underlying portfolio component 210, a fixed income component 220, and a scale-in component 230.

In various embodiments, the underlying portfolio component 210 includes the assets to be protected. In general, the underlying portfolio 210 does not have short-term liquidity and may be considered somewhat volatile or risky. In one implementation, the underlying portfolio component 210 includes an alpha-generating portfolio such as, for example, a fund of hedge funds portfolio. The use of CPPI for short time periods is difficult for an underlying fund of hedge funds portfolio with lock-ups and notice requirements.

In various embodiments, the fixed income component 220 is structured and arranged to provide a predictable amount of income. In various implementations, the fixed income component 220 includes a portfolio of low risk securities that provides a reasonably predictable or fixed rate of return. Examples of such low risk securities include, but are not limited to: bonds (e.g., corporate bond, municipal bond, treasury bond, treasury note, treasury bill, zero-coupon bond), and/or money market instruments (e.g., short-term debt securities, bankers' acceptances, commercial paper, negotiable certificates of deposit, treasury bills with a maturity of less than one year).

In general, the underlying portfolio component 210 represents a relatively small initial portion (e.g., 10%-20%) of the total amount of investment in the scale-in principal protection product 20, and the fixed income component 220 represents a relatively large initial portion (e.g., 80%-90%) of the total amount of investment in the scale-in principal protection product 20.

In various embodiments, the scale-in component 220 is structured and arranged to add direct or indirect exposure (e.g., via a swap or other derivative) to the underlying portfolio component 210 over the protection period (e.g., 1-3 years). In one implementation, the scale-in component 220 includes a scale-in algorithm having a scale-in frequency, a scale-in decision process, and a scale-in amount. The scale-in frequency may be set as frequently as once per month, and the scale-in amount at any one scale-in time may be fixed at a certain percentage (e.g., 10%), a certain amount (e.g., $10MM), or may be variable.

In various embodiments, the scale-in decision is made at the scale-in frequency (e.g., monthly) and is based on whether the cumulative return of the underlying portfolio component 210 (e.g., fund of hedge funds) exceeds a threshold cumulative amount. The threshold cumulative amount may be based on the return of the fixed income component 220 and may include a cost of insurance or other margin of error amount.

If the threshold cumulative amount is exceeded, a scale-in amount (e.g., an additional 10% investment) is allocated to the underlying portfolio component 210, indirectly via derivatives or directly from the fixed income component 220 to the underlying portfolio component 210. If the threshold cumulative amount is not exceeded, the original investment in the underlying portfolio component 210 is left in place, and no additional investment is made into the underlying portfolio component 210. Similar decision rules are applied at each scale-in time during the protection period.

As described above, the scale-in protection product 20 is structured and arranged to provide protection by allocating a large initial portion of the product 20 to the fixed income component 220 and by frequently increasing the allocation to the underlying portfolio 210 when the cumulative return of the underlying portfolio 210 is sufficiently positive. Consequently, a provider of the principal protection is able to provide principal protection with a low but non-zero probability that the returns of the scale-in protection product 20 will be less than the floor protection level committed to the client. According to various embodiments, the provider may be the entity, the client (e.g., an investor, an advisor to an investor, an investing entity, an insurer, etc.), or any combination thereof. The provider of the principal protection will bear any loss below such floor protection level.

Referring again to FIG. 1, at step 130, the entity conducts one or more simulations. In general, the entity conducts simulations to illustrate expected return scenarios. In various implementations, the entity uses Monte Carlo methods to determine the statistical characteristics of the scale-in principal protection product 210, and the simulation results may be presented to the client.

In general, the simulations may be structured and arranged to provide the client with expected return scenarios based on the statistical characteristics of a composite of past results from the underlying portfolio component 210 (e.g., fund of hedge funds) and the fixed income component 220 (e.g., money-market fund with high liquidity). In various embodiments, the simulations include different investment levels creating a menu of choices for the client. For example, the simulations may include different levels of initial investment allocations, protection periods, floor levels, scale-in frequencies, threshold cumulative amounts, and/or scale-in amounts.

The output from the simulations may include a distribution of expected outcomes of the scale-in principal protection product 20 based on a distribution of expected outcomes of the underlying portfolio component 210. The distribution of expected outcomes of the underlying portfolio component 210 simulations may be based on expected mean monthly returns (e.g., 60 basis points), an expected monthly standard deviation (e.g., 80 basis points), an expected distribution of returns (e.g., normal or fat tail), and an expected serial correlation or auto correlation of a month's returns to the previous months' returns.

In some cases, the simulations may demonstrate a very small probability (e.g., less than 1%) of the product's returns being less than the floor after one year, with even the lowest return out of a large number (e.g., 10,000) of Monte Carlo simulations being modest (e.g., slightly positive or negative) In some cases, the simulations may indicate the expected return above money market returns to be significant (e.g., more than 2% above short term rates).

At step 140, the client selects a scale-in principal protection product 20 for implementation. In general, based on the simulations, the client makes an informed selection of a scale-in principal protection product 20. In some cases, the client might want to have aggressive scaling to achieve higher returns while recognizing the probability of hitting the principal protection floor is higher. In other cases, a client might want to have conservative scaling with a very low probability of hitting the floor while recognizing the returns may be lower.

At step 150, the provider of the principal protection implements the scale-in principal protection product 20. In general, the provider may use direct investments (e.g., cash) and/or indirect investments (e.g., swaps and/or other derivatives) to implement the underlying portfolio component 210 and the fixed income component 220 initially and may use direct and/or indirect investments to scale-in or increase the exposure of the underlying portfolio component 210.

At step 160, the provider of the principal protection monitors the scale-in principal protection product 20. In general, the scale-in principal protection product 20 is monitored over time as market conditions change and returns occur. In various implementations, the provider of the principal protection monitors the interrelationships among the components and the returns developed in each component.

At step 170, the provider of the principal protection provides adjustments to the scale-in principal protection product 20 as needed. In general, the provider of the principal protection provides adjustments as market conditions change according to the scale-in algorithm and the returns developed in each component. For example, to the extent that the cumulative returns of the underlying portfolio component 210 are positive, the provider of the principal protection can increase the allocation such that there is a relatively high probability that any potential future negative returns from the underlying portfolio component 210 will be offset by past cumulative returns.

In various embodiments, the scale-in amount is set at a predetermined level of investment (e.g., 10%, $10MM). In other embodiments, the scale-in amount changes dynamically based on a level of outperformance, market conditions, and/or the time remaining in the protection period. For example, if the underlying portfolio component 210 is outperforming the fixed income component 220 by two or three times, the scale-in amount can be higher.

The degree of ongoing adjustments may depend on market conditions, fund of hedge funds results outside of those expected by the assumed statistical properties, investor preferences about the trade-off between portfolio expected returns and volatility, and/or requirements of a third party insurer. There could be circumstances under which it is appropriate to scale-out of a portion of the allocation to the underlying portfolio component 210, subject however to the withdrawal limitations (i.e., the liquidity) of such component.

Figure 3:
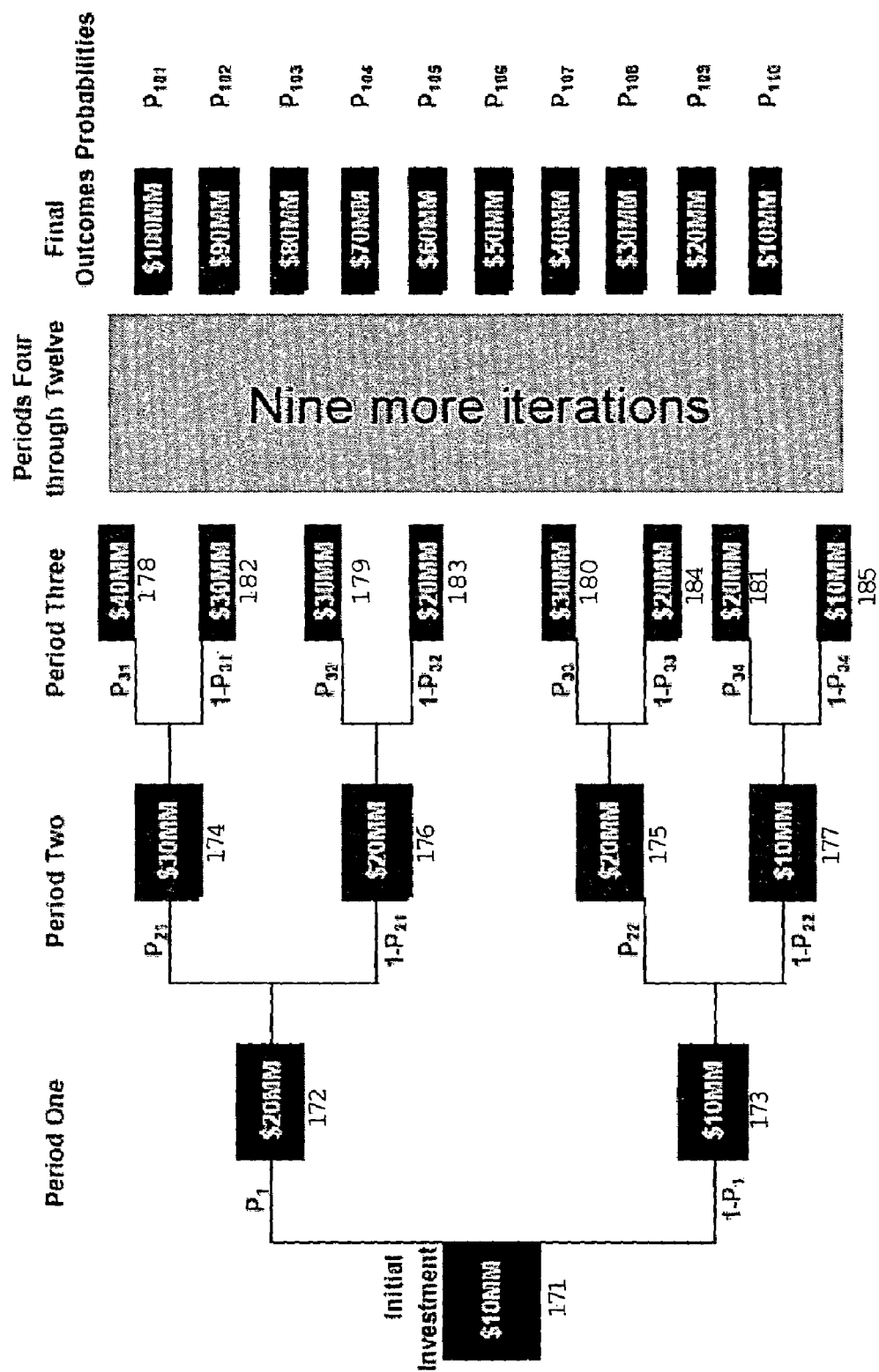
FIG. 3 illustrates various outcome probabilities associated with a financial product.

FIG. 3 illustrates various outcome probabilities associated with the scale-in principal protection product 20 over a twelve month period. In this example, adjustments to the underlying portfolio component 210 are made in increments of $10MM (scale-in amount) as frequently as once per month (scale-in frequency). Although the adjustments shown in FIG. 3 are made in increments of $10MM, it is understood that the adjustments may be made in any amount.

An initial investment of $10MM is made in the underlying portfolio component 210 at step 171. At the end of period one (month one), an additional $10MM is invested in the underlying portfolio component 210 at step 172 if the cumulative return of the underlying portfolio 210 (e.g., return of month one) exceeds a threshold cumulative amount. The threshold cumulative amount may be set at a cumulative rate of return that is related to the return of a fixed income component 220 (e.g., zero-coupon bond fund, money-market fund), for example. If the threshold is met, the exposure of the underlying portfolio component 210 is increased to $20MM at step 172. On the other hand, if the cumulative return of the underlying portfolio 210 does not exceed the threshold cumulative amount, no additional investment is made, and the exposure of the underlying portfolio component remains at $10MM at step 173. According to various embodiments, the threshold amount may be a non-cumulative amount.

At the end of period two (month two), an additional $10MM is invested in the underlying portfolio component 210 if the cumulative return of the underlying portfolio 210 (e.g., the combined return of month one and month two) exceeds a threshold cumulative amount (e.g., a threshold related to the return of a fixed income component 220 for month one and month two). If the threshold is met and the exposure of the underlying portfolio component 210 was $20MM at step 172, it is increased to $30MM at step 174. If the threshold is met and the exposure of the underlying portfolio component 210 was $10MM at step 173, it is increased to $20MM at step 175.

At the end of period two (month two), if the cumulative return of the underlying portfolio 210 does not exceed the threshold cumulative amount, no additional investment is made. If the exposure of the underlying portfolio component 210 was $20MM at step 172, it remains at $20MM at step 176. If the exposure of underlying portfolio component 210 was $10MM at step 173, it remains at $10MM at step 177.

At the end of period three (month three), an additional $10MM is invested in the underlying portfolio component 210 if the cumulative return of the underlying portfolio 210 (e.g., the combined return of month one, month two, and month three) exceeds a threshold cumulative amount (e.g., a threshold related to the return of a fixed income component 220 for month one, month two, and month three). If the threshold is met and the exposure of the underlying portfolio component 210 was $30MM at step 174, it is increased to $40MM at step 178. If the threshold is met and the exposure of the underlying portfolio component 210 was $20MM at step 176, it is increased to $30MM at step 179. If the threshold is met and the exposure of the underlying portfolio component 210 was $20MM at step 175, it is increased to $30MM at step 180. If the threshold is met and the exposure of the underlying portfolio component 210 was $10MM at step 177, it is increased to $20MM at step 181.

At the end of period three (month three), if the cumulative return of the underlying portfolio 210 does not exceed the threshold cumulative amount, no additional investment is made. If the exposure of the underlying portfolio component 210 was $30MM at step 174, it remains at $30MM at step 182. If the exposure of underlying portfolio component 210 was $20MM at step 176, it remains at $20MM at step 183. If the exposure of underlying portfolio component 210 was $20MM at step 175, it remains at $20MM at step 184. If the exposure of underlying portfolio component 210 was $10MM at step 177, it remains at $10MM at step 185.

As shown, the same decision making process may be followed for periods (months) four through twelve, in which case the final investment into the underlying portfolio component 210 ranges from $10MM to $100MM based on the cumulative returns over the protection period.

Other embodiments may include different scale-in algorithms and/or different time periods.

Figure 4:
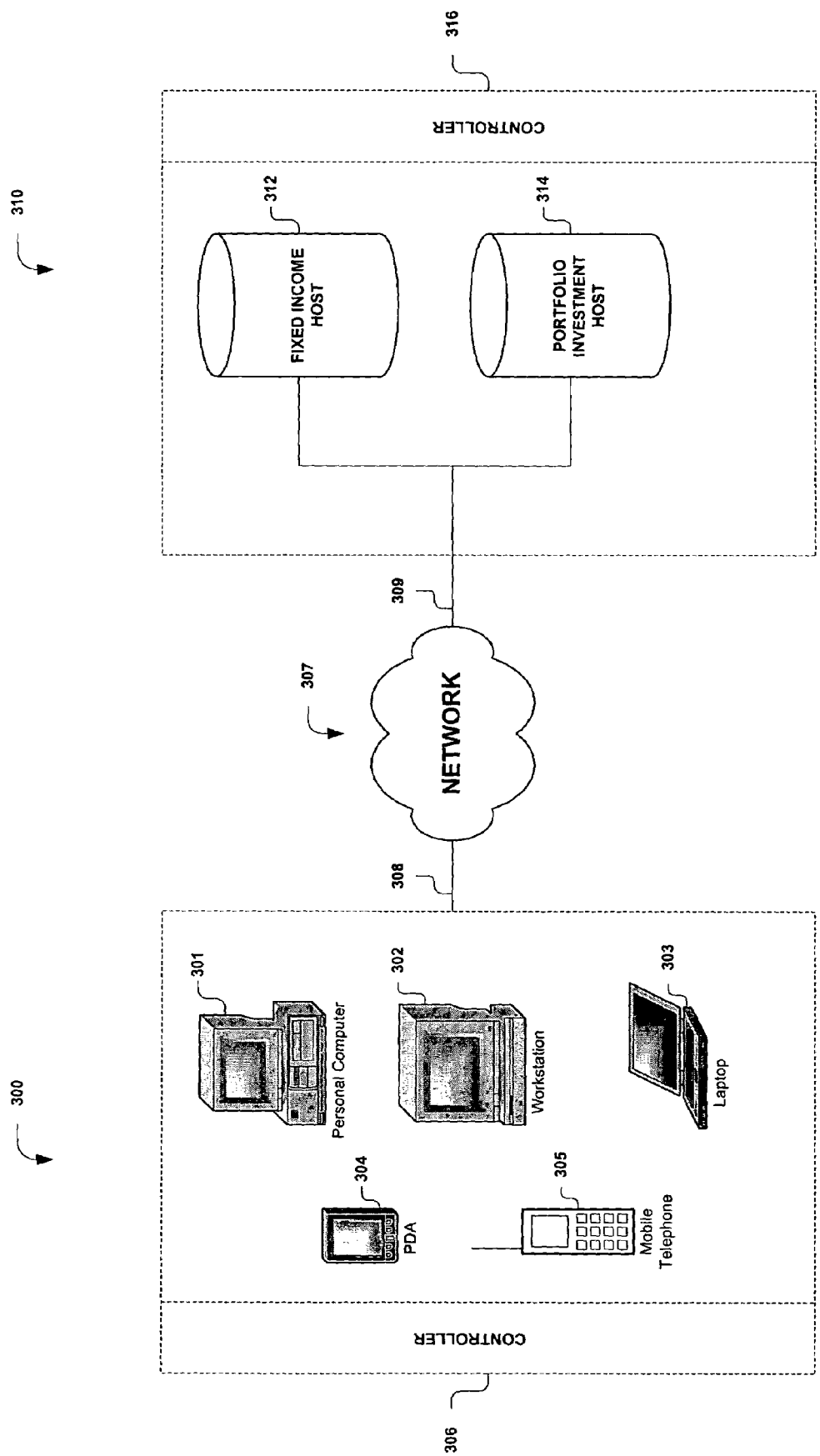
FIG. 4 illustrates various embodiments of a financial system.

FIG. 4 illustrates various embodiments of a financial system 30. In general, one or more elements of the financial system 30 may perform at least a portion of the method 10 and/or may implement at least a portion of the scale-in principal protection product 20, as described above.

As shown, the financial system 30 includes a client system 300 for presenting information to and receiving information from a user. The client system 300 may include one or more client devices such as, for example, a personal computer (PC) 301, a workstation 302, a laptop computer 303, a network-enabled personal digital assistant (PDA) 304, and a network-enabled mobile telephone 305. Other examples of a client device include, but are not limited to, a server, a microprocessor, an integrated circuit, or any other component, machine, tool, equipment, or some combination thereof capable of responding to and executing instructions.

In various implementations, the client system 300 operates under the command of a client controller 306. The broken lines are intended to indicate that in some implementations, the client controller 306, or portions thereof considered collectively, may instruct one or more elements of the client system 300 to operate as described. Examples of a client controller 306 include, but are not limited to a computer program, a software application, computer code, set of instructions, plug-in, applet, microprocessor, virtual machine, device, or combination thereof, for independently or collectively instructing one or more client devices to interact and operate as programmed.

The client controller 306 may be implemented utilizing any suitable computer language (e.g., C, C++, Java, JavaScript, Visual Basic, VBScript, Delphi) or software and may be embodied permanently or temporarily in any type of machine, component, physical or virtual equipment, storage medium, or propagated signal capable of delivering instructions to a device. The client controller 306 (e.g., software application, computer program) may be stored on a computer-readable medium (e.g., disk, device, and/or propagated signal) such that when a computer reads the medium, the functions described herein are performed.

In general, the client system 300 may be connected through a network 307 having wired or wireless data pathways 308, 309 to provider system 310. The network 307 may include any type of delivery system including, but not limited to a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 307 may include elements, such as, for example, intermediate nodes, proxy servers, routers, switches, and adapters configured to direct and/or deliver data.

In general, the client system 300 and the provider system 310 each include hardware and/or software components for communicating with the network 307 and with each other. The client system 300 and provider system 310 may be structured and arranged to communicate through the network 307 using various communication protocols (e.g., HTTP, TCP/IP, UDP, WAP, WiFi, Bluetooth) and/or to operate within or in concert with one or more other communications systems.

The provider system 310 generally hosts a set of resources for a group of users. As shown, the provider system 310 may include a fixed income host 312 and a portfolio investment host 314. In various embodiments, the fixed income host 312 and the portfolio investment host 314 are configured to collaborate in investment research, market research, product design, staffing, trading, controls, monitoring, marketing and client service.

In various implementations, the fixed income host 312 is configured to tailor the fixed income component for clients, and the portfolio investment host 314 is configured to manage the underlying portfolio component 210 of the scale-in principal protection product 20.

In various embodiments, the fixed income host 312 and the portfolio investment host 314 are configured to be jointly responsible for client reporting and for making exposure adjustments. The fixed income host 312 and the portfolio investment host 314 may interact with the client system 300 for managing cash settlements to swap counter-parties, futures margin flows, and other cash settlement requirements.

Each of the fixed income host 312 and the portfolio investment host 314 may be implemented by one or more servers (e.g., IBM® OS/390 operating system servers, Linux operating system-based servers, Windows NT™ servers) providing one or more assets (e.g., storage arrays, applications) to the group of users.

In various implementations, the provider system 310 operates under the command of a provider controller 316. The broken lines are intended to indicate that in some implementations, the provider controller 316, or portions thereof considered collectively, may instruct one or more elements of provider system 310 to operate as described. Examples of a provider controller 316 include, but are not limited to a computer program, a software application, computer code, set of instructions, plug-in, microprocessor, virtual machine, device, or combination thereof, for independently or collectively instructing one or more computing devices to interact and operate as programmed.

In general, provider controller 316 may utilize any suitable algorithms, computing language (e.g., C, C++, Java, JavaScript, Perl, Visual Basic, VBScript, Delphi), software and/or object-oriented techniques and may be embodied permanently or temporarily in any type of computer, computer system, device, machine, component, physical or virtual equipment, storage medium, or propagated signal capable of delivering instructions. The provider controller 316 when implemented as software or a computer program, for example, may be stored on a computer-readable medium (e.g., device, disk, or propagated signal) such that when a computer reads the medium, the functions described herein are performed.

The benefits of the disclosed methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives.

A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the disclosed invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the disclosed invention. It is therefore intended to cover all such modifications, alterations and adaptations without departing from the scope and spirit of the disclosed invention as defined by the appended claims.

What is claimed is:

1. A method of substantially protecting the principal of assets over an investment time period, wherein the investment time period comprises a plurality of consecutive scale-in sub-time periods, the method comprising:
    (a) conducting, by a computer system, a number of computer-implemented simulations to determine expected return scenarios for an investment of the assets in a first portfolio comprising a first portion of the assets and a second portfolio comprising a second portion of the assets, wherein the second portfolio is less risky than the first portfolio, wherein the first portfolio comprises an alpha-generating portfolio, wherein the second portfolio comprises at least one fixed income instrument, and wherein the computer system comprises a processor and a computer readable medium and is programmed to perform the computer-implemented simulations;
    (b) based in part on the expected return scenarios of the simulations of step (a), prior to the a start of the investment time period, selecting a scale-in amount that is to be allocated from the second portfolio to the first portfolio following each scale-in sub-time period of the investment time period when an actual return of the first portfolio over an evaluation time period for each scale-in sub-time period exceeds a threshold return amount for the first portfolio for the scale-in sub-time period;
    (c) prior to the start of the investment time period, selecting a scale-in frequency, wherein a duration of the scale-in sub-time periods is determined by the selected scale-in frequency; and
    (d) after a conclusion of each scale-in sub-time period, (i) determining the threshold return amount for the first portfolio for the scale-in sub-time period based on a return of the second portfolio over the evaluation time period for the scale-in sub-time period, and (ii) allocating the scale-in amount from the second portfolio to the first portfolio when the actual return of the first portfolio exceeds the threshold return amount for the first portfolio over the evaluation time period for the scale-in sub-time period, and not allocating the scale-in amount from the second portfolio to the first portfolio when the actual return of the first portfolio over the evaluation time period does not exceed the threshold return amount for the first portfolio for the scale-in sub-time period.

2. The method of claim 1, further comprising repeating step (d) after a second, successive scale-in sub-time period.

3. The method of claim 1, wherein allocating the scale-in amount from the second portfolio to the first portfolio comprises adding direct exposure to the first portfolio.

4. The method of claim 1, wherein allocating the scale-in amount from the second portfolio to the first portfolio comprises adding indirect exposure to the first portfolio.

5. The method of claim 1, wherein the scale-in frequency is once per month

6. The method of claim 1, wherein the scale-in amount is a percentage of the value of the second portfolio.

7. The method of claim 1, wherein the scale-in amount is comprises a fixed dollar amount.

8. The method of claim 1, wherein the computer-implemented simulations comprise computer-implemented Monte Carlo simulations.

9. The method of claim 1, further comprising adjusting the scale-in amount during the investment time period based on the performance of the first portfolio.

10. The method of claim 1, further comprising recursively repeating step (d)

11. The method of claim 1, wherein the evaluation time period for a scale-in sub-time period is related to the scale-in sub-time period.

12. The method of claim 2, wherein the evaluation time period for the second scale-in sub-time period is related to the cumulative first and second scale-in sub-time periods.

13. The method of claim 1, further comprising adjusting the scale-in amount based on the performance of the first portfolio and the second portfolio.

14. The method of claim 1, wherein the alpha-generating portfolio comprises a fund of hedge funds.

15. The method of claim 1, wherein the at least one fixed income instrument of the second portfolio comprises at least one fixed income instrument selected from the group consisting of a corporate bond, a municipal bond, a treasury bond, a treasury note, a treasury bill, a zero-coupon bond, a money market instrument, a short-term debt security, commercial paper, and a negotiable certificate of deposit.

16. The method of claim 1, wherein determining the threshold return amount for the first portfolio for the scale-in sub-time period comprises determining, by the computer system, the threshold return amount for the first portfolio.

17. The method of claim 1, wherein the computer system comprises a computer device selected from the group consisting of a server, a personal computer, a laptop computer, and a workstation.

* * * * *

UNITED STATES PATENT AND TRADEMARK OFFICE
CERTIFICATE OF CORRECTION

PATENT NO. : 7,689,492 B2
APPLICATION NO. : 11/196358
DATED : March 30, 2010
INVENTOR(S) : John S. Coates It is certified that error appears in the above-identified patent and that said Letters Patent is hereby corrected as shown below:

Claim 5:

Col. 10, Line 26, delete "once per month" and substitute therefor --once per month.--.

Claim 10:

Col. 10, Line 38, delete "repeating step (d)" and substitute therefor --repeating step (d).--.

Signed and Sealed this

Twenty-second Day of June, 2010

David J. Kappos
*Director of the United States Patent and Trademark Office*